United States Patent [19]

Orimoto et al.

[11] Patent Number: 5,447,766
[45] Date of Patent: Sep. 5, 1995

[54] PLASTIC VESSEL PREFORM AND MOLD FOR FORMING THE SAME

[75] Inventors: Hiroyuki Orimoto, Ueda; Fumiya Amari, Komoro, both of Japan

[73] Assignee: Nissei ASB Machine Co., Ltd., Nagano, Japan

[21] Appl. No.: 230,865

[22] Filed: Apr. 20, 1994

Related U.S. Application Data

[63] Continuation of Ser. No. 849,016, Apr. 22, 1992, abandoned.

[30] Foreign Application Priority Data

Sep. 28, 1990 [JP]  Japan ................. 2-261817

[51] Int. Cl.6 .................. B29D 1/00; B29C 33/12
[52] U.S. Cl. .................. 428/36.91; 428/36.9; 428/36.92; 428/35.7; 428/36.6; 428/36.7; 428/542.8; 215/12.1; 215/12.2; 215/42; 215/44; 425/525; 425/533
[58] Field of Search .............. 428/35.7, 36.6, 36.7, 428/36.91, 36.92, 542.8, 36.9; 215/12.1, 12.2, 31, 1 C; 425/525, 533; 264/274, 257, 318, 516, 513, 530

[56] References Cited

U.S. PATENT DOCUMENTS

| 3,115,682 | 12/1959 | Soubier et al. ............ 425/131.1 |
| 4,307,137 | 12/1981 | Ota et al. ................ 428/35.7 |
| 4,507,258 | 3/1985 | Aoki ...................... 264/255 |
| 4,572,811 | 2/1986 | Ota et al. ................ 264/25 |
| 4,715,504 | 12/1987 | Chang et al. ............. 215/1 c |
| 4,836,971 | 6/1989 | Denis et al. ............. 264/521 |

FOREIGN PATENT DOCUMENTS

| 0144450 | 6/1985 | European Pat. Off. . |
| 0302117 | 2/1989 | European Pat. Off. . |
| 61-35056 | 2/1986 | Japan . |
| 63-41 | 1/1988 | Japan . |
| 2-5564 | 1/1990 | Japan . |

*Primary Examiner*—Charles R. Nold
*Assistant Examiner*—Michael A. Williamson
*Attorney, Agent, or Firm*—Oliff & Berridge

[57] ABSTRACT

A plastic vessel preform includes a neck portion having an outer layer formed by an insert piece (20) which includes a thread portion (22a) and a support ring (28). The support ring (28) includes a bond reinforcing portion (36) integrally formed therein in a direction perpendicular to the axis or the preform body (34). The bond reinforcing portion (36) strengthens the radial bond in the insert piece (20) so that the mechanical strength at the neck portion (32) of the preform (30) can be greatly increased.

22 Claims, 10 Drawing Sheets

PLASTIC VESSEL PREFORM AND MOLD FOR FORMING THE SAME

This is a continuation of application Ser. No. 07/849,016 filed Apr. 22, 1992, now abandoned.

TECHNICAL FIELD

The present invention relates to a preform used to form a plastic vessel having a neck over which a screw cap can be fitted, and a mold usable in forming such a preform.

BACKGROUND TECHNIQUES

Vessels molded from plastic materials such as polyethylene terephthalate (PET) and the like and each having a neck over which a screw cap can be mounted are currently used for soft drinks and other beverages.

The soft drinks and particularly soft drinks with fruit juice contained therein are generally sterilized with high-temperature before they are charged into plastic vessels. Thus, the plastic vessels are required to have a sufficient heat resistance. Particularly, the non-stretched mouths of the plastic vessels must have a higher heat resistance such that any heat distortion will be prevented since the screw caps are to be fitted thereover.

Figure 12:
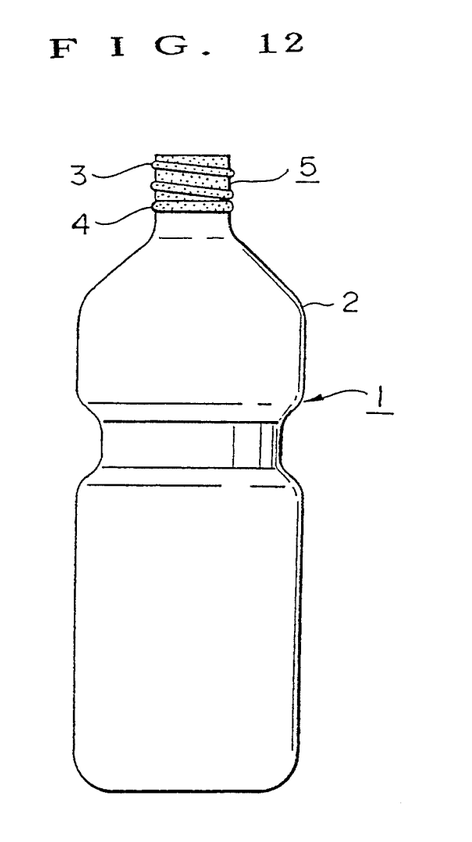
FIG. 12 is an elevational side view of the outline of a plastic vessel constructed according to the prior art.

One of the plastic vessels having their mouths which fulfill the above requirement is proposed, for example, in Japanese Patent Publication No. Sho 61-35056. As shown in FIG. 12, this technique provides a plastic vessel 1 which comprises a biaxially stretched vessel body 2 and neck portion 5. The neck portion 5 includes a thread 3 formed on the outer periphery thereof and a support ring 4. The heat resistance in the neck 5 is increased by once heating it up to a preselected temperature and then gradually cooling the neck to whiten and crystallize it. The plastic vessel 1 has an advantage that the neck portion 5 thereof is difficult to he distorted at raised temperatures and can maintain its dimensional accuracy at higher levels.

However, such a prior art has a problem in that if the degree of crystallization at the neck portion 5 is to be sufficiently increased, a portion or the vessel body 2 adjacent the neck portion 5 can be undesirably crystallized since the neck portion 5 is continuously connected to the vessel body 2. In other words, a portion of the vessel body 2 adjacent to the neck portion 5 will be undesirably crystallized when the neck portion 5 is crystallized in the preform forming step. The crystallized portion of the vessel body 2 becomes difficult to be biaxially stretched in the subsequent step. If the neck portion 5 is crystallized in such a step that the plastic vessel 1 has been biaxially stretched and blow molded, even a portion of the shoulder or barrel of the vessel body 2 in addition to the neck portion 5 can be crystallized and whitened.

Japanese Patent Publication No. Hei 2-5564 or U.S. Pat. No. 4,715,504 discloses a preform comprising an outwardly threaded insert piece made of a plastic material having an increased heat resistance and the neck and body portions of the preform other than the insert piece formed of another plastic material such as PET or the like. Such a preform is formed by first injection molding the insert piece from the increased heat resistant plastic material and then injection molding the PET material so that the insert piece will be embedded into the outer periphery of the neck portion.

The preform formed by the use of such an insert piece can overcome the aforementioned problem associated with the undesirable crystallization of a portion of the vessel body when the whole neck portion is crystallized and increase the heat resistance of the neck portion to a practically satisfactory level.

However, the use of the insert piece does not necessarily provide a sufficient bonding strength between the insert piece and the preform body. In the worst case, the insert Piece may be partially separated from the vessel body due to lead on fitting the screw cap.

In order to overcome the above problems in the prior art, the present invention has its object to provide a preform having an increased mechanical strength which comprises an insert piece formed of a plastic material having increased heat resistance and mechanical strength, such a plastic material being firmly bonded to another plastic material forming the inner layers of the preform body and neck portions, and also to provide a mold usable in molding such a preform.

DISCLOSURE OF THE INVENTION

In accordance with the present invention, a plastic vessel preform comprises a sleeve-like preform body, an insert piece having its properties different from those of said preform body and a neck portion including an outer layer formed with said insert piece and an inner layer at least partially formed of the same plastic material as that of said preform body, said insert piece including an outer and upper layer section having a thread portion on the outer periphery thereof and an outer and lower layer section located below said outer and upper layer section and having at least a support ring, said insert piece being formed of a crystallized plastic.

In such an arrangement, since the insert piece required to have its dimensional stability on heating is formed of the crystallized plastic, the neck portion of the vessel very superior in heat resistance can be provided by the present invention. Even if a liquid is to be charged, at a raised temperature, into the plastic vessel through the neck portion thereof or even if the vessel itself and its contents are heated for sterilization, the neck of the plastic vessel can be prevented from being shrink distorted by heat. A perfect seal can be provided between the neck of the plastic vessel and the cap.

The present invention also provides a plastic vessel preform comprising a sleeve-like preform body, an insert piece having its properties different from those of said preform body and a neck portion including an outer layer formed with said insert piece and an inner layer at least partially formed of the same plastic material as that of said preform body, said insert piece including an outer and upper layer section having a thread portion on its outer periphery and an outer and lower layer section located below said outer and upper layer section and having a support ring, the support ring of said insert piece also including a bond reinforcing portion injection molded together with said preform body and extending in a direction perpendicular to the axis of said preform body.

In such an arrangement, since the bond reinforcing portion is integrally formed in the support ring at the same time as the preform body and inner neck layer are injection molded, a contact area between the insert piece and the remaining plastic layers can be increased to improve the bond therebetween.

Since the bond reinforcing portion extends in a direction perpendicular to the axis of the preform body, the bond in the insert piece can be improved not only ill the axial direction but also in the radial direction of the preform body. More particularly, the insert piece can be more firmly bonded to the neck portion of the preform by bonding the inner wall of the insert piece with the inner plastic neck layer in the axial direction and also by bonding the support ring with the bond reinforcing portion in the radial direction. This results in epoch-making improvement with respect to buckling strength at the neck portion and also peel strength at the insert piece.

The present invention further provides a mold usable in forming a plastic vessel preform, said mold comprising a neck forming mold section, a cavity mold section and a core mold section, said neck forming mold further comprising an insert piece including an outer and upper layer having an outer thread on the outer periphery thereof and an outer and lower layer at least having a support ring and an engaged recess, said insert piece being held within said neck forming mold section when a preform is to be injection molded, the inner wall of said neck forming mold including a thread relief groove having a depth equal to or larger than the height of the outer thread in the insert piece and an engaging portion insertable into the engaged recess in the outer and lower layer of said insert piece, whereby said insert piece can be inserted into and held within said neck forming mold section in any circumferential direction.

The thread relief groove in said neck forming mold section serves as means for avoiding any interference between the neck forming mold section and the outer thread. On setting said insert piece, thus, it can be properly positioned within the neck forming mold section in the circumferential direction of the insert piece without need of any positioning device and/or process.

Furthermore, the neck forming mold section can reliably hold the insert piece at its outer and lower layer by causing said engaging portion to engage in the engaged recess of the insert piece.

BEST MODE FOR CARRYING OUT THE INVENTION

First Embodiment

Figure 1:
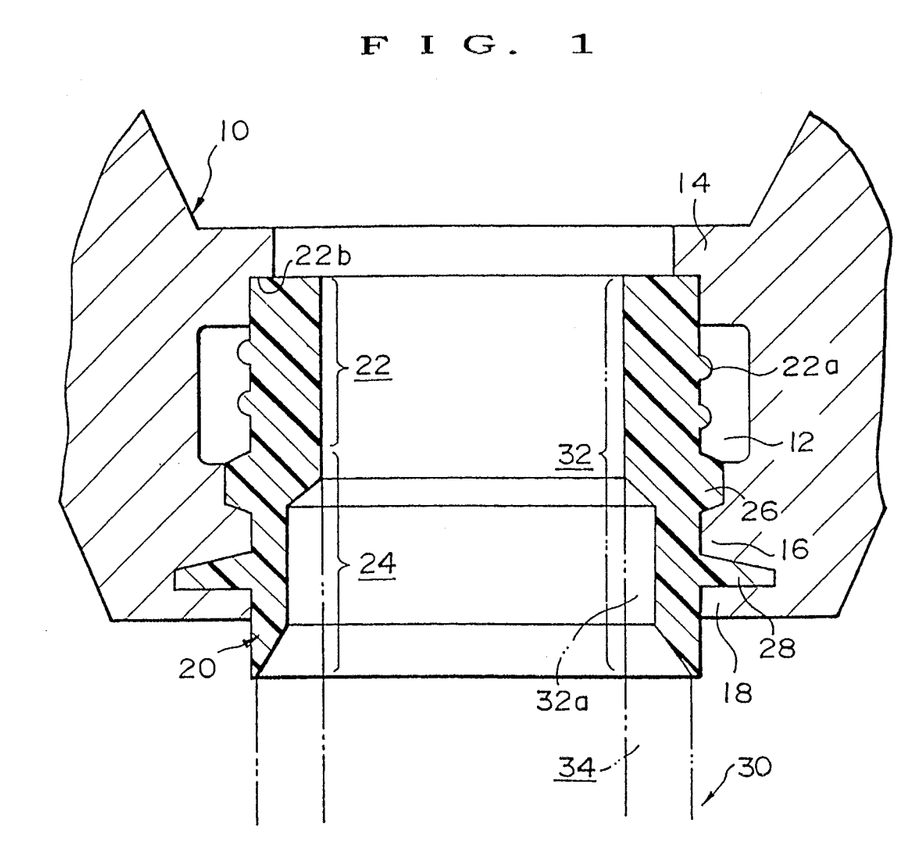
FIG. 1 is a fragmentary cross-section of the primary part of a first embodiment according to the present invention.

Referring first to FIG. 1, there is shown a neck forming mold 10 which Forms part of a preform forming mold according to the present invention, and an insert piece 20 held within the neck forming mold 10.

In this first embodiment, the insert piece 20 is in the form of a hollow sleeve which comprises an upper half forming an outer and upper layer section 22 with an outer thread section 22a formed therein at the outer periphery thereof and a lower half forming an outer and lower layer section 24 with locking and support rings 26, 28 formed therein.

The wall thickness of the outer and upper layer section 22 is equal to that of the neck portion of a preform 30 to be formed. At this location, the preform 30 is a single-layer structure. On the other hand, the outer and lower layer section 24 is reduced in wall thickness to provide an internal diameter larger than that of the outer and upper layer section 22.

The insert piece 20 must be formed of a plastic material having various properties such as heat resistance anti others which are required by the neck portion of a plastic vessel. The heat resistance used herein is a property of a plastic material that it will not be distorted under the temperature of the contents in a plastic vessel to be formed, that is, the sterilizing temperature as ranged between 70° C. and 95° C. Such a plastic material superior in heat resistance may be selected from a group consisting of polyethylene terephthalate, polybutylene terephthalate, polyethylene naphthalate, polypropylene, polyamide, polyacrylonitrile, polyvinylidene chloride, nylon, polyethylene, polycarbonate and the like. Among them, any crystalline plastic material may be crystallized to improve its heat resistance.

If the insert piece 20 is formed of a plastic material different from that of the preform body 34, the insert piece 20 may be formed of a blend of this different plastic material with that of the preform body. The insert piece may be formed with the same plastic material as the preform body, and then, be crystallized. When the insert piece and preform body are formed of the same plastic material, it provides advantages in that the bond between the insert piece 20 and the preform body 34 may be increased in strength and that the resulting vessel can be more easily recycled.

The neck forming mold 10 functions to hold the insert piece 20 and is used to mold the neck portion 32 of the preform The neck forming mold 10 is of a split sleeve-like member consisting of two or more sections which are movable in the radial direction by any drive means.

The neck forming mold 10 includes a ring-like thread relief groove 12 formed therein for preventing any interference between a thread section 22a on the outer periphery of the outer and upper layer section 22 and the inner wall of the neck forming mold 10 when the insert piece 20 is mounted in the neck forming mold 10. The groove 12 extends along the inner circumference of the neck forming mold 10 opposed to the thread section 22a of the outer and upper layer section 22 and has a depth larger than the height of the thread section 22a. When the neck forming mold 10 is closed to hold the insert piece 20 therein, the insert piece 20 is not required to be subjected to any circumferentially positioning step. When the insert piece 20 is to be mounted in the neck forming mold 10, means for holding and moving the insert piece 20 is only required, leading to a simplification in the neck forming mold and process.

The upward movement of the insert piece 20 relative to the neck forming mold 10 is restricted by the top face 22b of the insert piece 20 being engaged by the lower end of a first engaging section 14 in the neck forming mold 10. The elevational and transverse positioning operations of the insert piece 20 are accomplished by the engagement relationship between the locking and support rings 26, 28 of the insert piece 20, a second engaging section 16 of the neck forming mold 10 inserted between the rings 26 and 28, and a third engaging section 18 inserted below the support ring 28. Therefore, the insert piece 20 can be set within the neck forming mold 10 in a stable and accurate manner.

A process of forming a plastic vessel preform which uses the insert piece 20 and the neck forming mold 10 will be described with reference to FIGS. 2 through 4.

Figure 2:
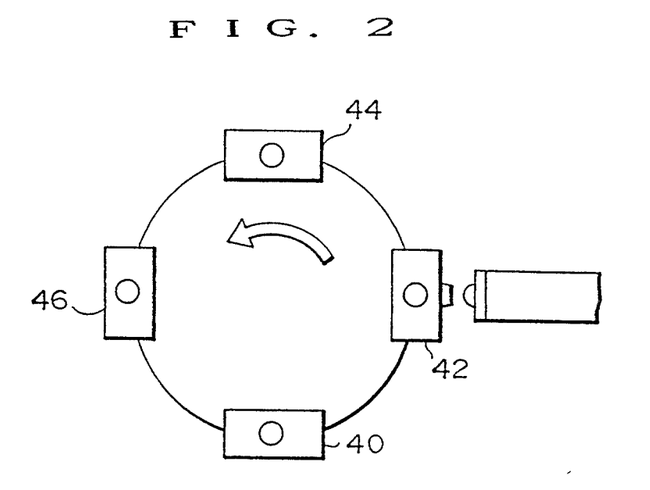
FIG. 2 is a diagram illustrating a process of making a plastic vessel.

Referring to FIG. 2, there is shown a cycle including all the steps of injection, stretch and blow molding a plastic vessel during one stage. The cycle includes an eject and insert step 40, a preform injection molding step 42, a temperature adjusting step 44 and a stretch and blow molding step 46.

Figure 3A:
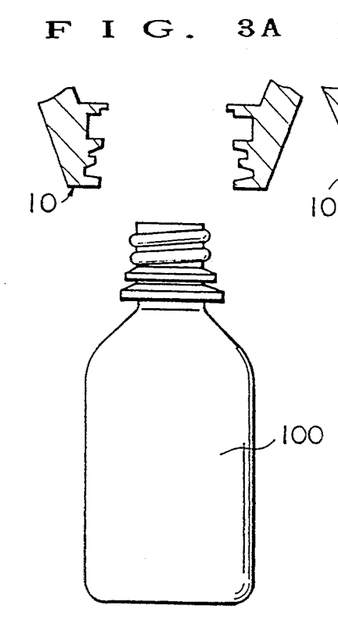
FIGS. 3A, 3B and 3C illustrate the eject and insert step in the process of FIG. 2.

FIGS. 3A, 3B and 3C illustrate the eject and insert step 40. In FIG. 3A, a finished plastic vessel 100 is ejected out of the neck forming mold 10 when the latter is opened, with the neck forming mold 10 also serving as means For carrying and holding the finished product.

Figure 3B:
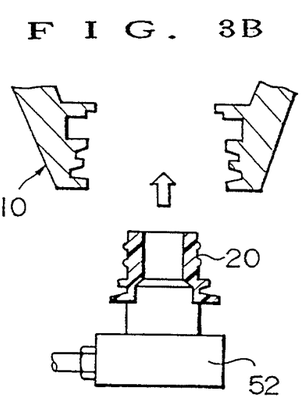
Figure 3C:
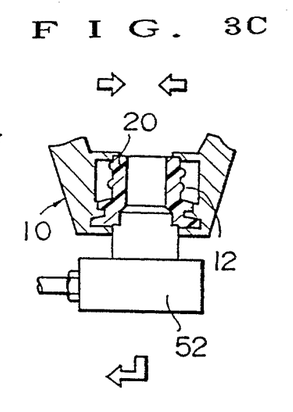

In FIG. 3B, the next insert piece 20 is being mounted into the neck forming mold 10. As described above, the insert piece 20 is previously injection molded from the aforementioned thermoplastic and heat-resistant plastic material. The insert piece 20 is moved to a position at which it is to be held in the neck forming mold 10 by the use of piece conveying means 52. As shown in FIG. 3C, the neck forming mold 10 is then closed so that the insert piece 20 will be reliably held in place under the aforementioned engagement relationship.

Figure 4:
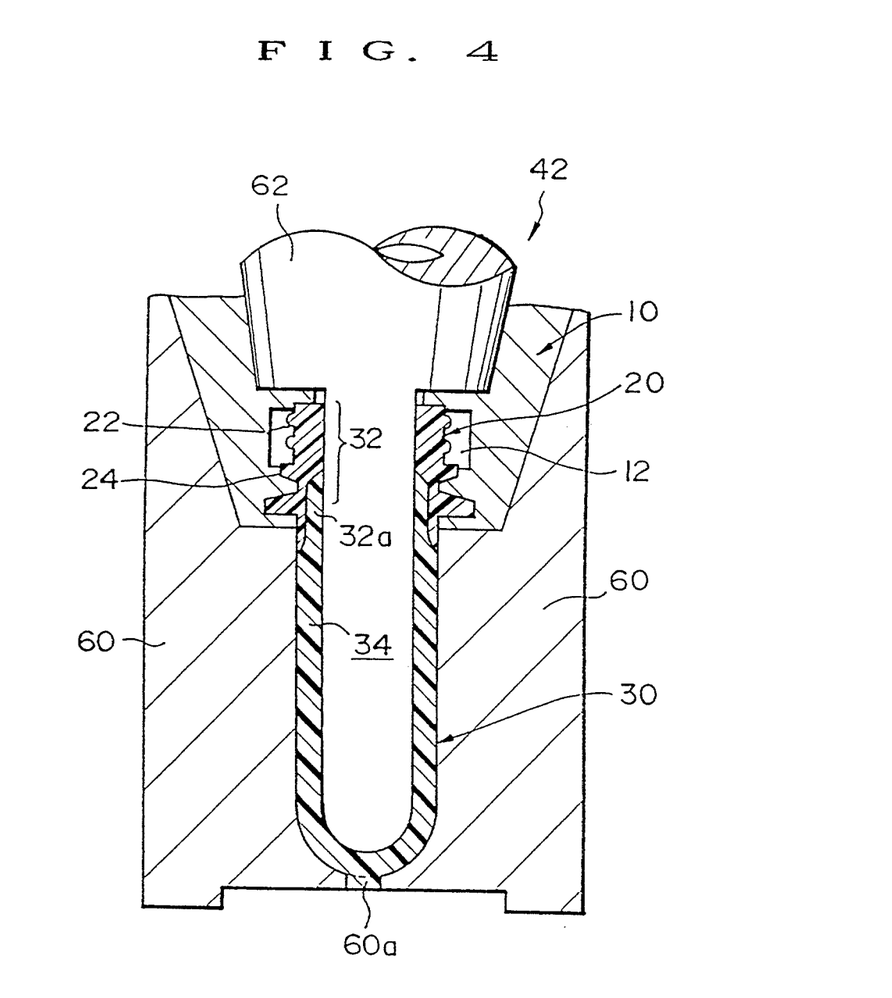
FIG. 4 is a schematic cross-sectional view illustrating the preform injection molding step.

FIG. 4 illustrates the preform injection molding step 42 in which the insert piece 20 is inserted into a cavity mold 60 while being held within the neck forming mold 10. A core mold 62 is also inserted into the cavity mold 60. Under such a situation, any suitable plastic material such as PET is injected into the cavity mold 60 through a gate 60a so as to form a preform which is continuously connected with the insert piece 20.

Thus, the preform 30 will be composed of the closed-end sleeve-like PET preform body 34 and the neck portion 32 in which the insert piece 20 is embedded. As best seen from FIG. 1, the upper half of the neck portion 32 is defined by the outer and upper layer section 22 of the insert piece 20 which is of a single-layer structure. The lower half of the neck portion 32 includes a double-layer structure which has an outer layer defined by the outer and lower layer section 24 of the insert piece 20 and an inner layer 32a formed of the same plastic material, PET, as used to form the preform body 34 of the preform 30.

In this embodiment, the wall thickness of the outer and upper layer section 22 of the insert piece 20 is equal to that of the neck portion 32 of the preform 30. The upper half of the neck portion 32 is formed only by this outer and upper layer section 22. On injection molding or the preform, therefore, the flow of the molten plastic material will be stopped below the outer and upper layer section 22, that is, inside the outer and lower layer section 24. Thus, the molten plastic material will not flow inside the outer and upper layer section 22 during the injection molding process. Consequently, the outer and upper layer section 22 will not be distorted into the thread relief groove 12 under the pressure of the molten plastic material, with the dimensional accuracy of the outer and upper layer section 22 being not damaged.

After the preform 30 has been injection molded, it is moved to the temperature adjusting step 44 while being held by the neck forming mold 10, as shown in FIG. 2. At the temperature adjusting step 44, the preform 30 is adjusted to a temperature suitable for stretching. Thereafter, the preform 30 will be stretch blow molded into a final product at the final step, that is, the stretch blowing step 46 by the use of the well-known technique. More particularly, the preform is biaxially stretched and blow molded into a vessel 100 within a blow cavity mold by axially moving a stretching rod and blowing pressurized air into the mold.

Second Embodiment

Figure 5:
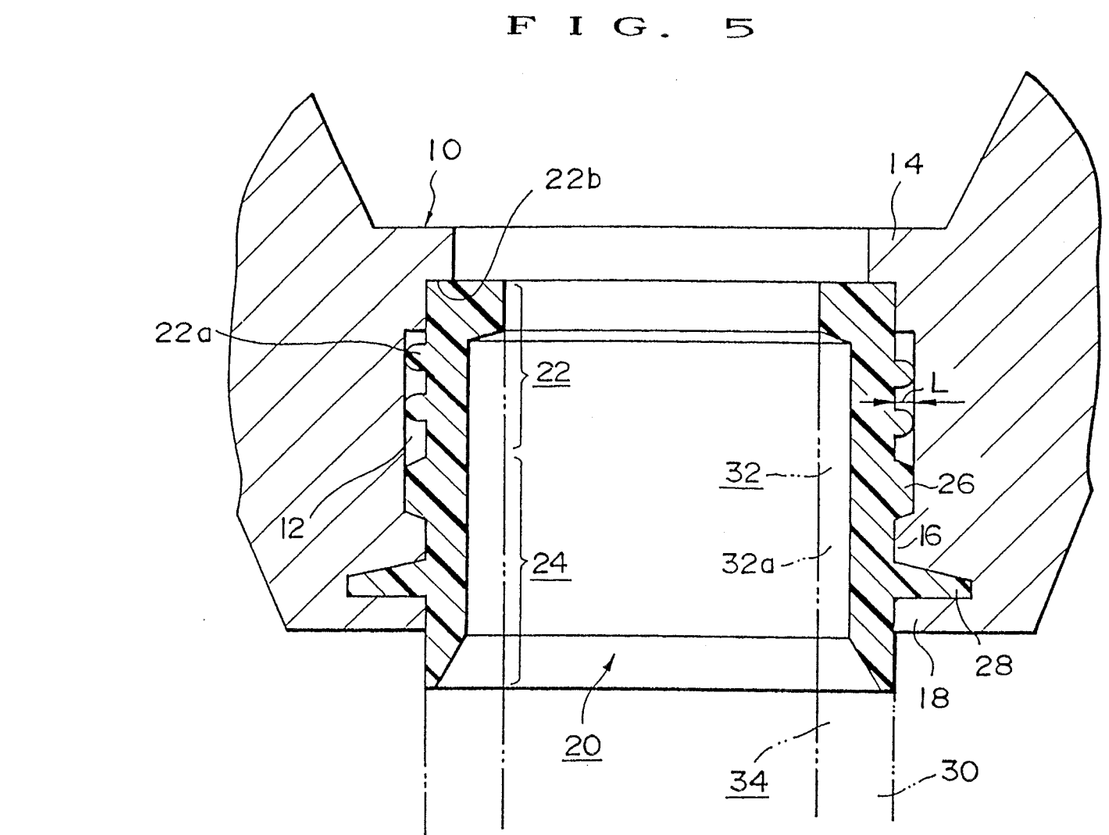
FIG. 5 is a fragmentary cross-section of the primary part of a second embodiment according to the present invention.

FIG. 5 is a fragmentary cross-section of a second embodiment of the present invention, in which components substantially similar to those of the first embodiment shown in FIG. 1 are denoted by similar reference numerals and will not be further described.

The second embodiment is similar to the first embodiment with respect to the structure holding the insert piece 20 relative to the neck forming mold 10, but different from the first embodiment in that the outer and upper layer section 22 of the insert piece 20 is reduced in wail-thickness except the top end thereof to provide a reduced wall-thickness equal to the wall-thickness of the outer and lower layer section 24. On injection molding a preform, the molten plastic material will flow not only inside the outer and lower layer section 24 but also inside the outer and upper layer section 22 except the top end thereof. In such a manner, the neck portion 32 or the preform 30 will have a double-layer structure including the insert piece 20 and an additional plastic layer 32a defining the preform body 34 inside the insert piece 20.

In the second embodiment, the thread relief groove 12 in the neck forming mold 10 has its depth I, equal to the height of the thread portion 22a of the outer and upper layer section 22 in order to prevent any distortion in the outer and upper layer section 22 required to have a higher dimensional accuracy due to the pressure of the molten plastic material injected, associated with the fact that the molten plastic material flows inside the insert piece 20 except the top end thereof. In such a manner, the outer and upper layer section 22 will not be undesirably distorted even if any outwardly urging force due to the flow of the molten plastic material acts on the outer and upper layer section 22, since the outermost side of the thread portion 22a is placed into abutment with the bottom of the thread relief groove 12.

Third Embodiment

Figure 6:
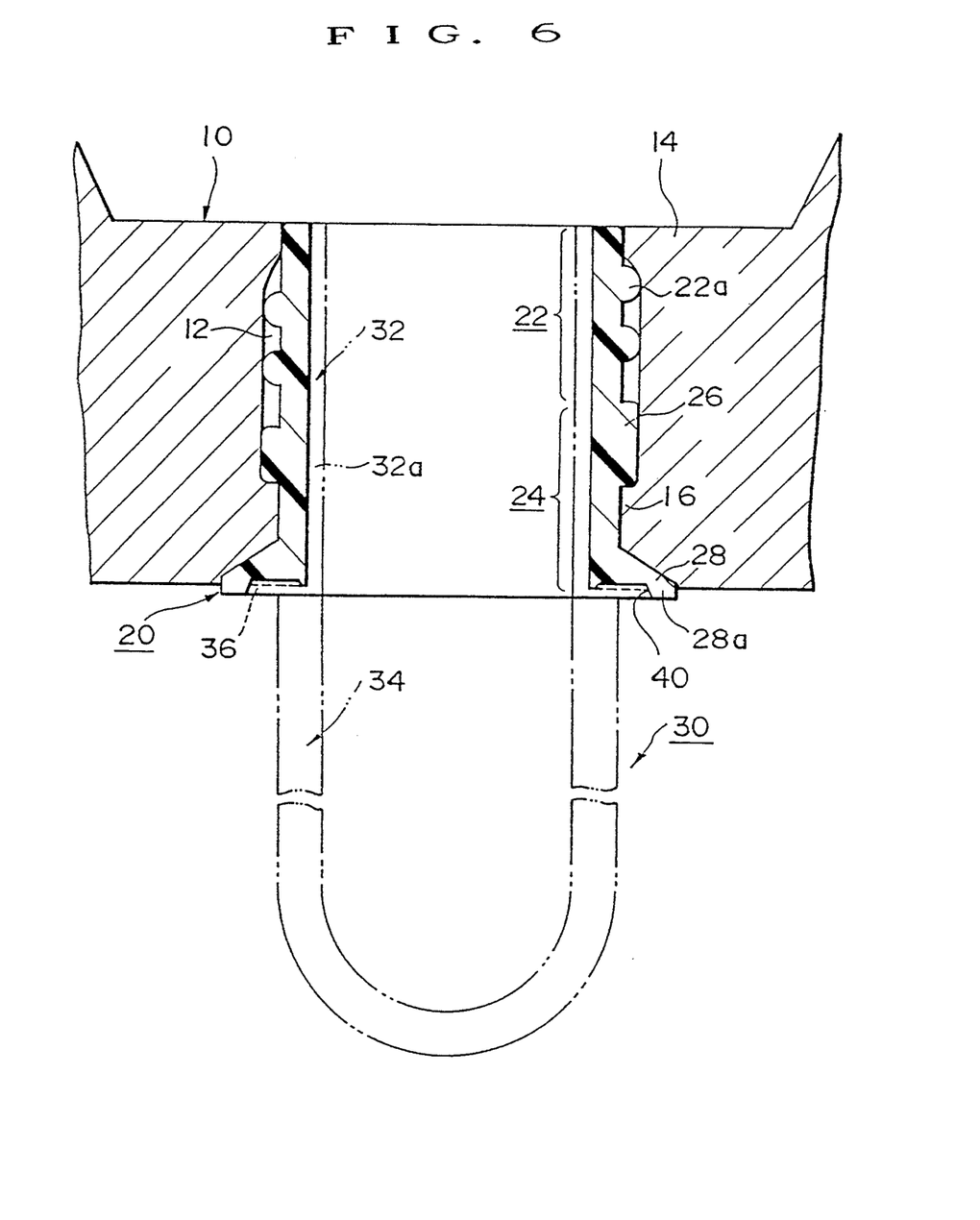
FIG. 6 is a fragmentary cross-section of the primary part of a third embodiment according to the present invention.
Figure 7:
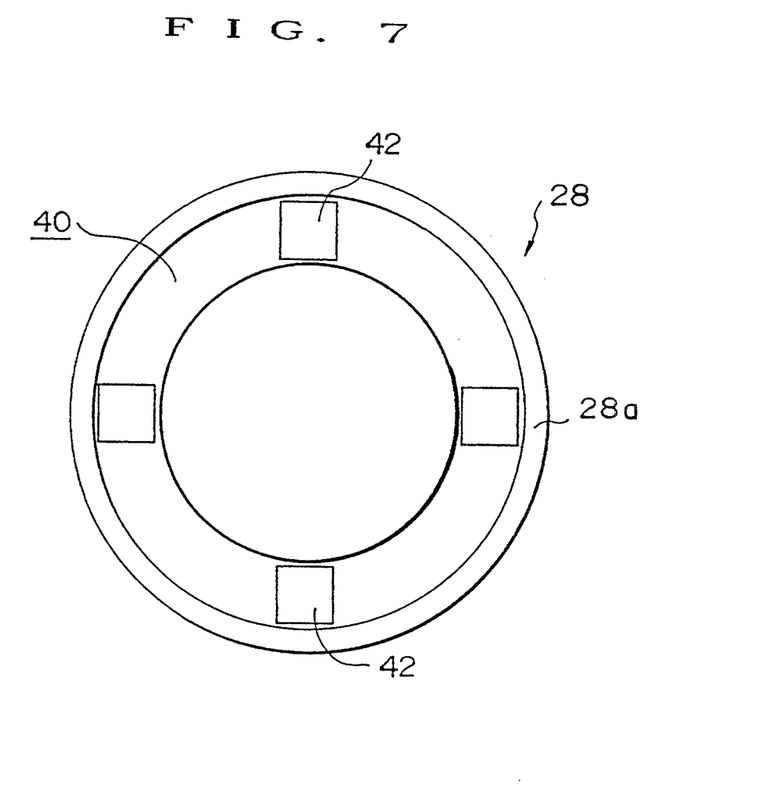
FIG. 7 is a bottom view of the insert piece shown in FIG. 6.

FIG. 6 is a Fragmentary cross-section of the third embodiment of the present invention while FIG. 7 is a bottom view of an insert piece used in the third embodiment.

In the third embodiment, the insert piece 20 has its inner non-stepped wall such that the wall-thickness of the outer and upper layer section 22 is equal to that of the outer and lower layer section 24. On injection molding a preform, thus, the molten plastic material will enter inside the inner wall of the insert piece 20 from the top end to the bottom end thereof to provide a neck portion 32 which is of a double-layer structure consisting of the insert piece 20 and the inner layer 32a.

The third embodiment is characterized by that the bottom face of the support ring 28 includes a recess 40 formed therein to be communicate with the interior of the insert piece 20. The recess 40 is a ring-like configuration which is formed by the raised margin 28a of the support ring 28. The recess 40 includes a plurality of recessed engaging portions 42 (four in the third embodiment) which are angularly disposed by 90 degrees, as shown in FIG. 7. When a preform is molded, the molten plastic material flows into both the recess 40 and recessed engaging portions 42. After solidified, the plastic material will form a bond reinforcing portion 36 integrally connected with the preform body 34 and support ring 28.

This bond reinforcing portion 36 increases the contact area between the insert piece 20 and the preform body 34 so that they will be bonded to each other more firmly. Since the recess 40 extends in a direction perpendicular to the axis of the preform body 34, the bond reinforcing portion 36 will be formed to extend in the radial direction relative to the preform body 34. The bond between the insert piece 20, the preform body 34 and the inner layer 32a will be further increased in the axial and radial directions.

It is preferred in the standpoint of aesthetics that the marginal section 28a of the support ring 28 is formed if the insert piece 20 is different in color from the preform body 34. The marginal section 28a serves to unify the neck portion 32 in color.

In the third embodiment, the insert piece 20 is wholly reduced in wall-thickness in comparison with those of the first and second embodiments. If the wall-thickness of the insert piece 20 is too small, the insert piece 20 itself may be distorted by the pressurized plastic material on the injection molding process. The minimum wall-thickness of the insert piece 20 should be equal to 1.2 mm and preferably ranged between 1.3 mm and 1.5 mm.

Experimental Examples

Preforms using insert pieces formed according to the third embodiment were measured with their buckling load and peel strength.

Figure 8:
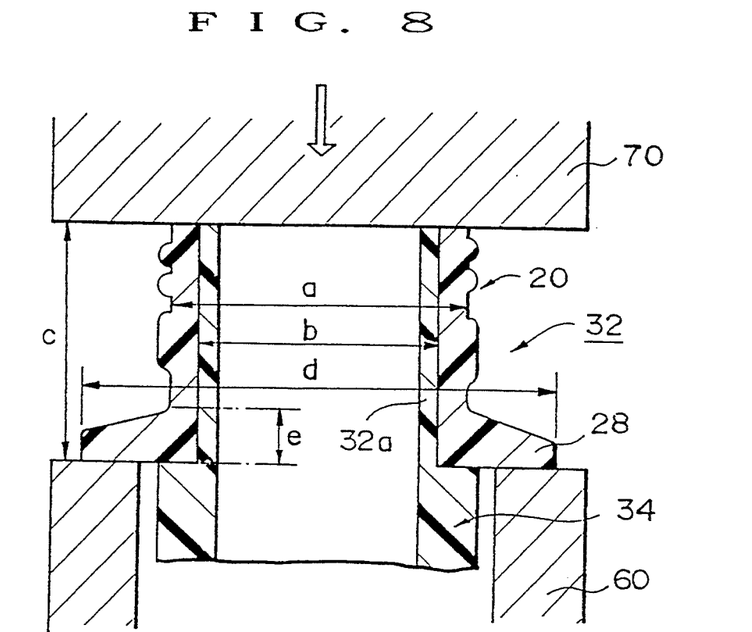
FIG. 8 is a diagrammatic view of a device for testing the strength of a neck portion in a preform which utilizes an insert piece having a support ring without any bond reinforcing section.
Figure 9:
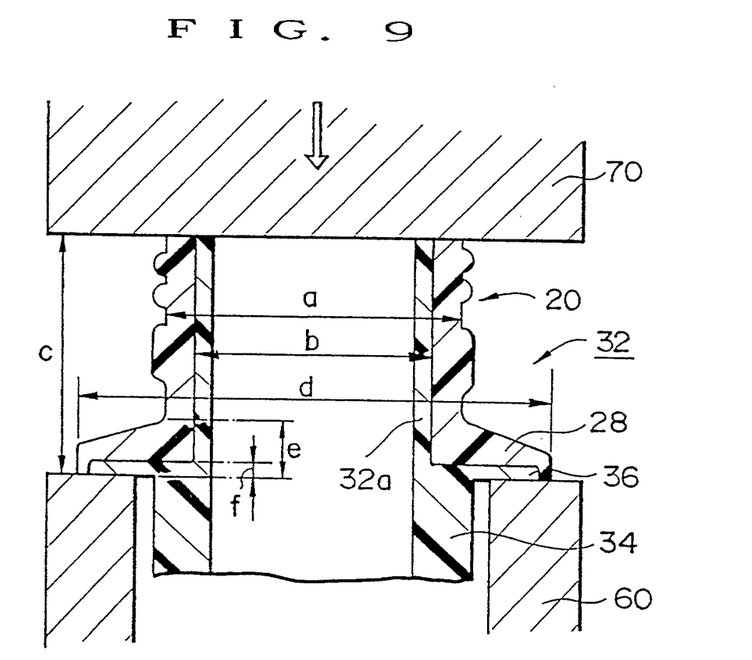
FIG. 9 is a diagrammatic view similar to FIG. 8, the device being used to test the strength of a neck portion in a preform which has a support ring provided with a bond reinforcing portion.

FIG. 8 illustrates a device for testing preforms having no bond reinforcing section in the support ring 28 while FIG. 9 illustrates a preform having a bond reinforcing portion 36 formed at the support ring 28, which is set in the testing device.

(1) Object

It is to verify how much the preform having the bond reinforcing section 36 at the support ring 28 is different from the preform having no bond reinforcing section with respect to the peel strength in the insert piece 20 and the buckling load in the neck port ion 32.

The peel strength of the insert piece 20 used herein means the magnitude of a load when the insert piece 20 begins to peel from the inner layer 32a.

(2) Process

The measuring system used was a compression testing machine "TCM 500" manufactured by SHINKO TSUSHIN KOGYO Company. This compression testing machine comprises a base 60 including a central hollow portion into which the preform body 34 is to be inserted, and a pressing portion 70. A preform to be measured is set in the central hollow portion of the base 60 with the support ring 28 thereof being placed on the end face of the base 60. The pressing portion 70 is placed on the top face of the neck portion 32.

Measurements were carried out at room temperature or 90° C. with the compression rate equal to 10 mm/minute.

The neck portions 32 of the preforms measured had sizes a to f as follows:

a: 24.94 mm
b: 22.36 mm
c: 22.52 mm
d: 33.00 mm
e: 5.03 mm
f: 0.50 mm

The preform bodies 34 of the preforms were formed of PET while the insert pieces 20 were made of polycarbonate.

(3) Results a. The preform shown in FIG. 8 exhibited the following results when they were measured at room temperature.

Peel Strength: 263 kg/cm$^2$; and
Buckling Load: 468 kg/cm$^2$.

b. Results of the preform shown in FIG. 9 when it was measured at room temperature:

Even when the preform was subjected to a lead equal to 500 kg/cm$^2$ which was the maximum compressive force in the compression testing machine, no peeling and buckling were found in the insert piece. Although we did not find any accurate measurement, it is certain that the peel strength and buckling lead exceed 500 kg/cm$^2$.

c. Results of the preform shown in FIG. 9 when it was measured at 90° C.:

The buckling lead measured was equal to 280 kg/cm$^2$ and no peeling was found in the insert piece when the buckling created.

From the above results, it will be apparent that the buckling strength in the neck port ion can be greatly improved with the peel strength of the insert piece at room temperature by providing the bond reinforcing portion 36 in the support ring 28. Furthermore, the sufficiently large buckling strength will be provided even at raised temperatures while at the same time the bonding strength in the insert piece is very high.

Fourth Embodiment

Figure 10:
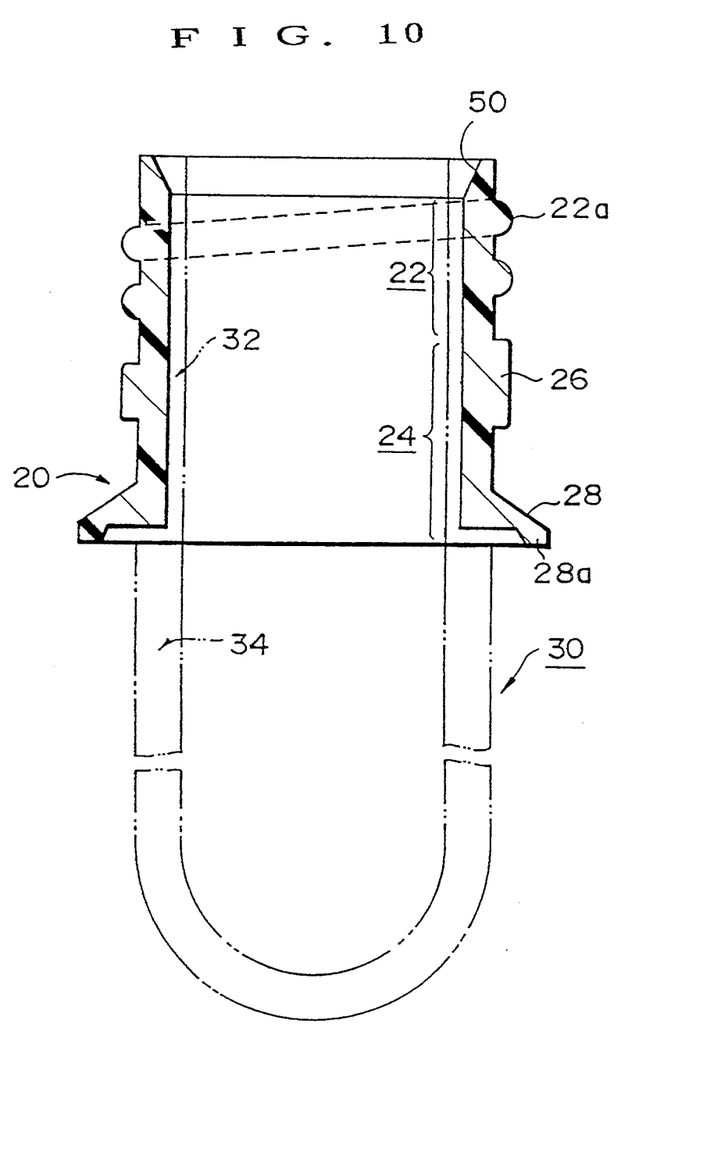
FIG. 10 is a fragmentary cross-section of the primary part of a fourth embodiment according to the present invention.

FIG. 10 is a fragmentary cross-section or the fourth embodiment of the present invention.

The fourth embodiment is basically similar to the third embodiment, except that the insert piece 20 of the fourth embodiment includes a top tapered end 50 formed therein. The top tapered end 50 is Formed by a ring-like slope having its diameter which gradually linearly increases toward the top end. In order not to reduce the mechanical strength in the thread portion which is subjected to lead when a cap is fitted over the neck portion, the top tapered end 50 is located above the top end of the thread portion 22a.

The top tapered end 50 of the insert piece functions to facilitate the perfect ingress of the molten plastic material into the top end of the neck portion 32 when the preform body 34 is injection molded. This prevents any failure in molding.

Fifth Embodiment

Figure 11:
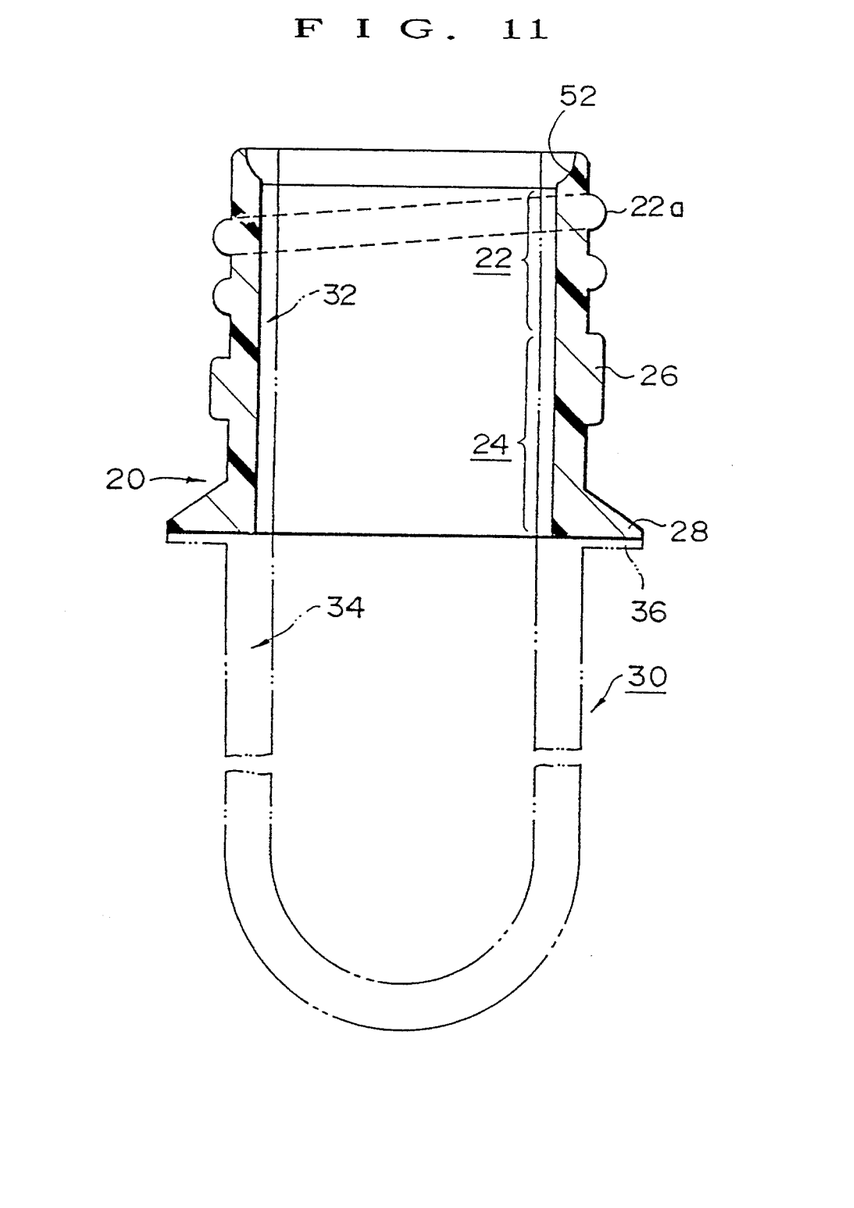
FIG. 11 is a fragmentary cross-section of the primary part of a fifth embodiment according to the present invention.

FIG. 11 is a fragmentary cross-section of the fifth embodiment of the present invention.

The fifth embodiment is basically similar to the fourth embodiment except that the top tapered end 52 of the insert piece 20 is formed by an inwardly concave curve and that the support ring 28 includes a ring-like bond reinforcing portion 36 formed at the bottom face thereof to extend along the circumference of the support ring 28.

The top tapered end 52 provides a further improved anti-peel property in comparison with the top linearly tapered end 50 of the fourth embodiment since the insert piece 20 can more effectively disperse forces when it is subjected to the top pressure for a capper.

In the fourth embodiment, the raised margin section 28a of the support ring 28 extending along the circumference thereof tends to create a peel adjacent the corner thereof. In the fifth embodiment, however, the bond between the support ring 28 and the bond reinforcing portion 36 can be increased against the vertical compressive force.

Although the present invention has been described as to some embodiments, it is not limited to such embodiments and may be applied to various modified and changed forms within the scope of the present invention. For example, the insert piece 20 may take various constructions and forms unless it at least comprises the outer and upper layer section 22 having the thread portion 22a and the outer and lower layer section 24 mountable into the neck forming mold 10. The thread relief groove 12 in the neck forming mold 10 is not limited to a particular configuration unless it can receive the thread portion 22a. The necessary properties of the neck portion in the preform include not only the heat resistance but also the safeness, mechanical strength and so on. The insert piece may be formed of any suitable plastic material selected depending on these necessary properties.

As will be apparent from the foregoing, the present invention can provide a plastic vessel preform which includes an insert piece formed of a plastic material having an increased heat resistance and more firmly connected with the neck portion through an improved bonding strength, and a mold usable in molding such a preform.

We claim:

1. A two-piece plastic vessel preform comprising:
   a tubular preform body piece having an open end and formed of a plastic material having a first set of mechanical properties; and
   an insert piece having a second set of mechanical properties different from the first set of mechanical and properties;
   wherein said insert piece comprises:
   an upper portion and a lower portion,
   the upper portion having a minimum wall-thickness at least equal to 1.2 mm and having an inner surface and an outer surface having a set of threads, and
   the lower portion having an inner surface and an outer surface, the outer surface having a support ring, the support ring having a bottom face extending in a direction substantially perpendicular to a longitudinal axis of said tubular preform body piece and said bottom face comprising a bond reinforcing portion injection molded together with said tubular preform body piece, said bond reinforcing portion comprising a plastic layer.

2. A two-piece plastic vessel preform as defined in claim 1 wherein the plastic layer is formed by injecting the plastic material into a recess formed in the bottom face of said support ring except for a margin section of the ring.

3. A two-piece plastic vessel preform as defined in claim 2 wherein the recess has an inner surface comprising at least one of a concave portion and a convex portion for reinforcing the coupling between said insert piece and said tubular preform body piece.

4. A two-piece vessel preform as defined in claim 1 wherein the inner surface of the upper and lower portions of the insert piece comprise a first mating portion, and an upper portion of the tubular preform body piece formed adjacent the open end has an outer surface comprising a second mating portion, wherein the insert piece and the tubular preform body piece are coupled together by mating the first mating portion to the second mating portion to form a double-layer structure extending along a longitudinal axis of said double-layer structure and wherein a top end of said upper portion of said insert piece has an internal diameter, which gradually increases in an upward direction.

5. A two-piece plastic vessel preform as defined in claim 4 wherein the top end has a tapered inner surface having a linearly variable diameter.

6. A two-piece plastic vessel preform as defined in claim 4 wherein the top end of said insert piece has a curved inner surface having an arcuate cross-section.

7. A two-piece plastic vessel preform as defined in claim 1 wherein the plastic material forming said insert piece may be selected from the group consisting of polyethylene terephthalate, polybutylene terephthalate, polyethylene naphthalate, polypropylene, polyamide, polyacrylonitrile, polyvinylidene chloride, polyethylene, and polycarbonate.

8. A two-piece plastic vessel preform as defined in claim 1 wherein said insert piece is crystallized.

9. A plastic vessel preform as defined in claim 1 wherein said insert piece is formed of a crystallized form of the plastic material used to form the tubular preform body piece.

10. A two-piece plastic vessel preform as defined in claim 1 wherein said insert piece has a minimum wall-thickness at least equal to 1.2 mm.

11. A plastic vessel preform as defined in claim 1 wherein the plastic material forming said insert piece comprises nylon.

12. A two-piece plastic vessel preform as defined in claim 1, wherein the plastic layer is formed by injecting the first plastic material on the entire bottom face of said support ring.

13. A two-piece plastic vessel preform as defined in claim 12, wherein the bottom face has an inner surface comprising at least one of a concave portion and a convex portion for reinforcing the coupling between said insert piece and said tubular preform body piece.

14. A two-piece plastic vessel preform comprising:
a tubular preform body piece having an open end and formed of a plastic material having a first set of mechanical properties;
an insert piece having a second set of mechanical properties different from the first set of mechanical properties;
wherein said insert piece comprises:
an upper portion and a lower portion,
the upper portion having an inner surface and an outer surface having a set of threads,
the lower portion having an inner surface and an outer surface, the outer surface having a support ring, the support ring having a bottom face extending in a direction substantially perpendicular to a longitudinal axis of said tubular preform body piece and said bottom face comprising a bond reinforcing portion injection molded together with said tubular preform body piece, said bond reinforcing portion comprising a plastic layer formed on the bottom face of the support ring; and
the inner surface of the upper and lower portions of the insert piece comprising a first mating portion, and an upper portion of the tubular preform body piece formed adjacent the open end having an outer surface comprising a second mating portion, wherein the insert piece and the tubular preform body piece are coupled together by mating the first mating portion to the second mating portion to form a double-layer structure extending along a longitudinal axis of said double-layer structure, and wherein a top end of said upper portion of said insert piece has an internal diameter which gradually increases in an upward direction.

15. A two-piece plastic vessel preform as defined in claim 14, wherein the top end has a tapered inner surface having a linearly variable diameter.

16. A two-piece plastic vessel preform as defined in claim 14, wherein the top end of said insert piece has a curved inner surface having an arcuate cross-section.

17. A two-piece plastic vessel preform as defined in claim 14, wherein the plastic material forming said insert piece may be selected from the group consisting of polyethylene terephthalate, polybutylene terephthalate, polyethylene naphthalate, polypropylene, polyamide, polyacrylonitrile, polyvinylidene chloride, polyethylene and polycarbonate.

18. A two-piece plastic vessel preform as defined in claim 14, wherein said insert piece is crystallized.

19. A two-piece vessel preform as defined in claim 14, wherein said insert piece is formed of a plastic material obtained by crystallizing the same plastic material used for said preform body.

20. A two-piece plastic vessel preform as defined in claim 14, wherein said insert piece has a minimum wall-thickness at least equal to 1.2 mm.

21. A two-piece plastic vessel preform comprising:
an uncrystallized tubular preform body piece having an open end and formed of a plastic material having a first set of mechanical properties, and
a crystallized insert piece having a second set of mechanical properties different from the first set of mechanical properties, wherein said insert piece comprises:
an upper portion having a minimum wall-thickness at least equal to 1.2 mm, an inner surface, an outer surface having a set of threads, and a top end having an internal diameter that gradually increases in an upward direction; and
a lower portion having an inner surface and an outer surface, the outer surface having a support ring, the support ring having a bottom face extending in a direction substantially perpendicular to a longitudinal axis of said tubular preform body piece, the bottom face having a recessed portion, the recessed portion having an inner surface contacting a bond reinforcing plastic layer injection molded together with said tubular preform body piece, the inner surface comprising at least one of a concave portion and a convex portion for reinforcing coupling between said insert piece and said tubular preform body piece.

22. A mold suitable for use in molding a plastic vessel preform, said mold comprising a neck-forming-mold section, a cavity-mold section and a core-mold section, said mold further comprising an insert piece including an upper portion having an outer surface with an outer thread and a lower portion having an outer surface with a support ring and an engaged recess, said insert piece being held within said neck-forming-mold section when a preform is to be injection molded, an inner wall of said neck-forming-mold section including: an annular thread relief groove having a depth at least equal to a height of the outer thread of the insert piece; a section above the thread relief groove contacting the outer surface of the upper portion of the insert piece; and an engaging portion insertable into the engaged recess, whereby said insert piece can be inserted into and held within said neck-forming-mold section in any circumferential direction.

* * * * *